United States Patent Office 3,591,421
Patented July 6, 1971

3,591,421
POROUS ELECTRODE HAVING LYOPHOBIC MATERIAL AFFIXED TO THE WALLS OF THE PORES
Hans A. Schultze, Neuenhain, and Dieter Spahrbier, Frankfurt am Main, Germany, assignors to Varta Aktiengesellschaft, Frankfurt am Main, Germany
Filed Sept. 26, 1966, Ser. No. 581,819
Claims priority, application Germany, Sept. 25, 1965, V 29,399
Int. Cl. H01m 13/00
U.S. Cl. 136—120  8 Claims

ABSTRACT OF THE DISCLOSURE

A porous gas diffusion electrode is made up of a single layer of porous material having two opposite faces and pores extending from one face to the opposite face of the electrode. These pores open through the two opposite faces. The walls of the pores are provided with particulate lyophobic material. At the wall area of the pores near their openings at one face of the electrode, the particulate lyophobic material is densely affixed to the wall. The density of the distribution of the particulate lyophobic material decreases along the length of the pores to essentially no coverage adjacent the pore openings at the opposite face of the electrode.

---

Figure 1:
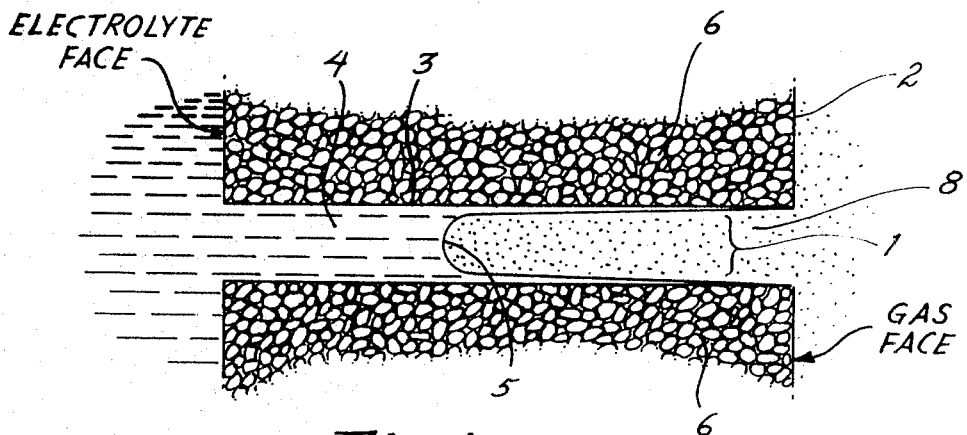

This invention relates to improved porous, plate-like electrodes which comprise two opposite faces and channel-like pores extending transversally through the electrodes from face to face and to a process for their manufacture.

Porous electrodes wherein a liquid penetrates into the channel-like pores from one face and a gas from the other face so that the gas and the liquid meet and interact within the individual pores of the electrodes are well known and are generally designated as "gas-diffusion electrodes."

The interface between gas and liquid may be formed within the individual pores of the electrode, if it has the ability of soaking up a liquid from one side, without being actually permeable to the liquid. This is generally not possible when the electrodes are made from the commonly used construction materials. It has therefore been proposed to impregnate the electrode with water- or electrolyte-repelling materials, such as paraffin, pitch, wax or hydrophobic synthetic resinous materials in order to prevent the pores of the electrode from becoming completely filled with the liquid. See, for example, "Fuel Cell Systems," Advance in Chemistry Series 47, American Chemical Society, Washington, D.C. (1965), pages 9–33.

Electrodes which are treated in this manner often have the disadvantage that they are completely repellent to liquids and especially to the electrolytes with which they are to be used. As a result, the three-phase boundary between the gas, the liquid and the solid catalytic material of the electrode, which is essential for the electrochemical reaction does not establish itself at all or exists only at the surface of the electrode which is contacted by the liquid.

Other attempts have been made to avoid these difficulties by covering one surface of the electrode which has been made hydrophobic in this manner with a layer of porous hydrophilic material. This measure complicates the manufacture of the electrode and increases its thickness. Furthermore, in these prior attempts, it was necessary to observe special care in the selection of the proper hydrophobic and hydrophilic materials to ensure that the two porous bodies could be joined by heat treatment. Alternatively, it was necessary to use expensive frames in order to hold the differently treated hydrophobic and hydrophilic layers pressed together.

In the practice of these proposals of the prior art it has been found that part of the pores of the electrode became partially or completely plugged in the course of impregnating the electrode. A further disadvantage of the electrodes impregnated by the prior art methods is the fact that substantial areas of the catalytically active surface of the electrode may be made ineffective by being covered or coated with a layer of the hydrophobic material. All these various shortcomings of the prior art have adversely affected the efficiency of the electrochemical reaction in one manner or another.

It is therefore an object of the present invention to provide a porous electrode which establishes three phase boundaries within the interior of the pores of the electrode, when it has one face exposed to a liquid electrolyte and the other face exposed to an operating gas, as in a fuel cell. Another object is to provide an electrode which does not have the disadvantages of the electrodes of the prior art even though it may be constructed simply as a single layer electrode.

It is another object of the invention to provide a new gas-diffusion electrode which upon contact with a liquid electrolyte establishes three phase boundaries of greatly increased length between the electrolyte, gas and solid catalyst material in the pores of the electrode.

A further object of the invention is the provision of an electrode which is characterized by substantially lower polarization values than those attained in gas-diffusion electrodes of the prior art.

Still another object of the present invention is the provision of a new process which permits the production of the novel gas diffusion electrodes of the invention.

Other objects will become apparent as the description of the invention proceeds.

The invention provides an electrode which comprises channel-like pores extending from one face of the electrode to the opposite face wherein the walls of said pores at the openings at one of the faces are densely covered with lyophobic particles which gradually decrease in their density of distribution toward the other openings of the pores at the opposite of the electrode face. In operation, the side of the electrode to which the pores, the walls of which are densely coated with lyophobic particles, open, is the gas face of the electrode whereas the opposite side of the electrode is its electrolyte face.

The present invention thus provides novel electrodes comprising channel-like pores extending transversally from a first face to the second, or opposite, face of the electrode, wherein the walls of said pores are provided with permanently adherent particulate lyophobic materials which decrease in their density of distribution from a dense packing and preferably full wall coverage at the openings of the pores in said first face to no coverage at the exits of said pores at said second face.

The porous electrode bodies of the present invention are characterized by channel-like pores in which the walls at the openings of the pores pointing to one face of the electrode are coated, or densely covered with lyophobic particles, the coverage of which decreases in density in the direction toward the exits, or opposite openings of the channel-like pores. Typical electrodes of the invention are riddled with intercommunicating pores of varying length and diameter extending through innumerable ramifications from one face of the electrode to the other, the walls of the pores being provided with the lyophobic materials as described, the extent and depth of coverage of the lyophobic material on the walls of the individual pores varying depending on the size of the pores and the lyophobic material. Typically the pores on the body of the electrode have an average pore length between about three to about six times the electrode thickness, the extent of penetration of the lyophobic material thus varying within the individual pores while still exhibiting the described gradient of density of distribution within each electrode pore.

It is generally preferred that the part of the electrode body comprising the lyophobic particles is at least 0.15 mm. thick and that the thickness of the electrode which is penetrated by the electrolyte until it reaches the innermost layer of lyophobic particles is about 0.3 mm. to 0.5 mm. It is furthermore of advantage if the deviation of the diameter of all particles from the average particle diameter is small, preferably ±50%. The depth to which the lyophobic material extends within the pores to the proximity of the electrolyte face of the pores can be varied within certain limits depending on such factors as thickness of the electrode, nature of electrolyte, operating pressure and so on, but it is essential that the lyophobic material extends only to the proximity of the opening of the pores to allow for penetration of the electrolyte into the pores.

The advantages of the invention can be realized where the lyophobic particles have been incorporated in an electrode which has been made from metal and carbon, or in an electrode which comprises a porous carbon body.

Excellent results are generally obtained with electrode bodies wherein the incorporated lyophobic particles comprise polytetrafluoroethylene and/or of polyolefines, e.g. polyethylene or polypropylene; or chlorinated polyolefines, e.g. polyvinylchloride; or copolymers of the latter with polypropylene; or polychlorotrifluoroethylene or equivalent synthetic resins.

Figure 2:
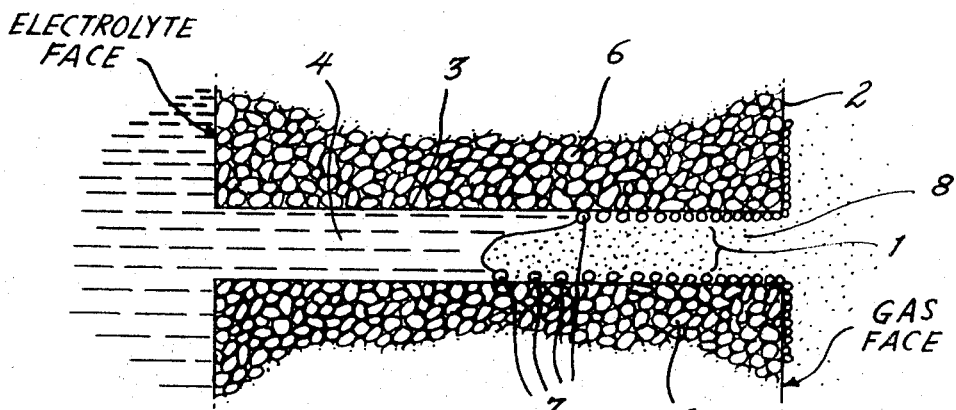

The FIGS. 1 and 2 in the attached drawings demonstrate the invention in an idealized schematic representation of the channel-like pores in a sintered electrode for use for example in a fuel cell, FIG. 1 showing an individual pore in a prior art electrode and FIG. 2 showing an individual pore containing a deposit of sintered lyophobic particles with a decreasing density of distribution along the length of the pore in accordance with the present invention. While, for purposes of illustration, the pores in FIGS. 1 and 2 have been shown as cylindrical channels with straight sides running at right angles to the gas face and to the electrolyte face, it should be understood that in actuality each pore may wind its way from face to face and the actual average length of the pore may be a multiple in length of the actual thickness of the electrode.

It becomes apparent from the foregoing that the optimum average depth of the pores, from one face of the electrode to its opposite face, on the walls of which lyophobic particles are deposited in decreasing density of distribution depends directly on the thickness of the electrodes. With the commonly used thin gas-diffusion electrodes the deposit of lyophobic particles extends preferably at least to a depth of 0.3 mm. and stops in accordance with the above requirements a sufficient distance before reaching the opposite openings of the pores to allow for the penetration of the electrolyte from the electrolyte face of the electrode into its pores. Of course, with thicker electrodes, the depth of the cover of lyophobic particles of decreasing density may be more than 0.3 mm., e.g. 1 to 2 mm. for an electrode with a total thickness of 3 mm. For best results and highest efficiency and performance of the electrodes, it is preferred that the decrease of the density of distribution of the lyophobic particles follows as closely as possible the ideal density gradient from full coverage on and at the gas face side to zero coverage within the walls of the pores of the electrode facing the electrolyte. However, quite satisfactory results are also obtained if the actual distribution varies more or less from said ideal distribution as long as the primary requirement of dense coverage at one of the openings of the pore and practically no coverage within the pore and near the opposite opening of the pore is fulfilled.

The particles adhering on the walls of the individual pores of the electrode have been designated hereinbefore as "lyophobic" particles. This term is intended to mean that the particles are made from or contain a material which has no, or only little, affinity for the liquid electrolyte with which the electrodes are to be used. If these liquids are organic liquids which are not miscible with water, the particles are conveniently made from an organophobic material. Generally, and in most instances, the electrodes are operated with aqueous or water-miscible or water-containing liquids. In these instances, it is required that the said particles, forming the cover of decreasing density on the interior wall areas of the pores are hydrophobic materials. Suitable hydrophobic materials are materials which, besides having a sufficiently high degree of hydrophobicity toward the electrolytes or other liquids with which the electrodes are intended to be used have a sufficiently high chemical and corrosion resistance toward the electrolyte or other liquids. Another requirement is that the materials have a sufficiently high softening or melting point to withstand the temperatures at which the electrodes are to be operated, without the material melting or softening or otherwise degrading. Still another requirement is that the lyophobic or hydrophobic material be available in a particle size suitable for the practice of the invention. Such materials are readily selectable by one skilled in the art.

The preferred particle size of the lyophobic or hydrophobic material, respectively, depends on various factors, particularly the size and the diameters of the pores of the electrode. The particle diameter should be smaller than the diameter of the pores, preferably, substantially smaller than the average diameters of the pores. The preferred particle size depends also in part on the method used for depositing the particles in the pores and on the material used for the construction of the electrode as well as on the final results desired and on the intended use.

Generally, the diameter of the individual particle should preferably be no more than about $\frac{1}{5}$ of the average diameter of the pores. In practice, particles of much smaller size, usually having a diameter of less than $\frac{1}{10}$ of the average diameter of the pores are preferably used. In gas diffusion electrodes generally, pore size may range from as little as about 3 microns to 50 microns or more. However, the particle size should not be so small that under conditions of sintering the particle would lose its particulate form. Retention of the particulate form is essential for the practice of the invention since the particles serve as the bridges on which the electrolyte meniscus extends within the pore at the gas-liquid-electrolyte meniscus extends within the pore at the gas-liquid-electrode interface.

For best results, it is preferred that the particles have as uniform a size as is possible. In the manufacture of the electrodes of the present invention it is preferred to select and use a powder of hydrophilic or lyophobic material which has a distribution of the diameter of the individual particles which ranges as closely as possible about a desired median or average value, preferably $d \pm 50\%$, where $d$ equals the average diameter. The desired narrow range of size distribution may be achieved by sifting, or classifying by other known methods the material which may be obtained in the desired fine form by grinding, or other methods. A narrow range of size distribution and the desired fineness of the powder is generally obtained with powders which are synthetic hydrophobic materials, such as powdered synthetic resins or plastics generally obtained in suspension or emulsion polymerization, at least 50% of which may be within the micron range discussed above. Such resins are readily available to one skilled in the art.

As stated hereinbefore, suitable lyophobic or hydrophobic particulate materials which can be used with advantage in the practice of the present invention are all those sinterable materials which have the lyophobic or hydrophobic properties to the required degree. In the selection of the material, one should take into consideration the temperature range in which the electrode is intended to be operated, whether the electrolyte is an acid, or an alkaline liquid, whether the intended electrolyte has a tendency of dissolving a given lyophobic or hydrophobic material, and whether the electrolyte would tend otherwise to make the material ineffective. It has been found that polyolefins, or their halogenated derivatives, are suitable materials for use in most instances. Partially, or fully, halogenated synthetic resinous materials are generally preferred in those instances where it is intended to use a strongly corrosive electrolyte or where it is desired to operate the electrodes in the electrochemical devices at relatively high temperatures.

The novel porous electrode bodies of the present invention may be readily prepared by introducing the sinterable lyophobic or hydrophobic powder into the pores at one face of an electrode body with subsequent localization or fixing of the particles of the powder on the walls of the channel-like pores as by sintering in the density of distribution described above. For example, the lyophobic or hydrophobic powder can be drawn into one face of a porous electrode body by reducing the atmospheric pressure on the opposite, or reverse, side of the electrode body. The lyophobic or hydrophobic powder may also be uniformly distributed, coated, or spread over one face of a porous electrode body and subsequently forced into the pores by increase of atmospheric or gaseous pressure on that face. In another embodiment of the process of the invention, the lyophobic or hydrophobic powder is suspended in a carrier liquid, which is then drawn into a porous electrode body from one face only by the capillary action of the porous body, with subsequent evaporation of the carrier liquid at a temperature below its boiling point. In all these variants of the process of the invention the lyophobic or hydrophobic powder is advantageously bound to the walls of the channel-like pores of the porous body by the application of heat at a temperature sufficient only to sinter the particles but insufficient to melting them completely.

A suitable process for the production of the novel wet-proofed electrodes or electrode bodies of the invention comprises the steps of first introducing the sinterable powder having the lyophobic or hydrophobic properties at one of the faces of the electrode body into the channel-like pores, and thereafter localizing or fixing the powder of particles on the walls of the pores in the density of distribution described above by heating the electrode body to temperatures at which the powder particles soften or begin to melt at their outer surfaces. The process can be carried out with electrodes made from a variety of materials, such as metals, carbon, high melting point synthetic resin materials or from ceramic materials, or from mixtures of these materials. A list of suitable materials is found, for example, in Justi, U.S. Pat. 2,860,175, column 5.

The average depth of penetration of the powder in the individual channel-pores can be controlled and depends in part on the particle size of the powder, on the diameters of the pores, the nature of the wall surfaces of the pores and of the material from which the powder is made. By varying the applied atmospheric or gas pressure, the vacuum or reduced gas or atmospheric pressure, and the time of the application of pressure or reducing the pressure, or causing a vacuum, respectively, and by the choice of suitable sinterable, powdered materials, it is possible to control to the extent desired the depth of penetration and the distribution of the powder particles on the wall surfaces of the pores.

The temperatures useful for the sintering step are those well known for the sintering of the particular lyophobic or hydrophobic powder material being used. It is, as described, necessary to avoid complete melting of the individual particles in order not to destroy the particulate nature of the deposited, localized particles.

According to one embodiment, the insertion of the powder particles into the pores of the electrode body may be achieved by positioning and supporting the electrode body in a semi-enclosed supporting structure which has a gas line connection to its inner surface. The electrode is oriented in such manner that the gas face, i.e. the face of the electrode which is intended to contact the operating gas in the fuel cell (and which lies opposite the face contacting the electrolyte) is freely exposed. Thereafter, this gas face is laid onto the smoothed surface of a layer of free flowing sinterable lyophobic or hydrophobic powder. Simultaneously or subsequently a vacuum of short duration is applied to the opposite face of the electrode by means of the gas line connected to the supporting structure. The powder penetrates the pores in the characteristic distribution described above.

In another embodiment, the process may be carried out in such manner that a similarly supported electrode is moved, with intermittent application of a vacuum to its enclosed face side, through a chamber in which fine particles of the powder are uniformly whirled up and thrown against the exposed, or gas side face. The electrode is then heated in on oven to sinter the particles.

In yet another embodiment of the process of the invention, the electrodes are placed into tightly fitting indentations in a larger, plane working surface in such a way that only the edges of the electrode are supported in the indentations, and the upper electrode face is situated below the level of the working surface at a distance sufficient to leave space for the required amount of the lyophobic or hydrophobic powder. The powder is then spread into the flat cavity formed in this manner and made level with the surface of the working area. Thereafter, a vacuum is applied to the space below the working area through appropriate means for a short time, whereupon the powder penetrates into the gas face of the electrode with the characteristic distribution in the channel pores as described hereinbefore. The electrode is then heated as discussed above to sinter the particles in the pores.

With the latter arrangement, it is also possible to apply an increased pressure at the free top, side of the electrode body instead of or in addition to the vacuum, on the electrolyte side and to blow the powder contained on this face of the electrode body into the pores.

Duration of the application of the vacuum or increased pressure of the gas or air to the respective surfaces of the electrode, and the optimum amount and the suitable particle size of the powder required for a specific electrode body in order to provide the pores with the desired covering of the particulate material can readily be ascertained by one skilled in the art.

The various methods described in detail in the foregoing are particularly suited for the large-scale manufacture of the wet-proofed electrodes of the present invention. For the localization or fixing of the particles of the powder deposited on the interior wall surfaces of the pores of the electrode it is only necessary to heat the electrode body to a temperature at which the lyophobic or hydrophobic particle sinters and fuse onto the walls of the channel-pores.

For small-scale runs with individual electrodes in which it is desired to test various porous electrode bodies or lyophobic or hydrophobic materials, the following method can be used with particular advantage. The powder of the lyophobic or hydrophobic material is homogeneously suspended or slurried in an inert liquid which neither attacks or adversely affects the powder nor the electrode body to any significant degree. Thereafter, the dry, porous electrode body is carefully immersed into the suspension in such a manner that only one surface of the electrode, the pores of which are intended to be coated with the densely packed particles is evenly placed against the surface of the liquid layer and sufficiently immersed to provide liquid contact. The electrode body soaks up the suspension like a sponge, whereby the concentration of the particles in the suspension, as the suspension liquid penetrates deeper into the pores as a result of the capillary forces is gradually reduced with increasing depths of penetration. The liquid is then removed by any suitable method as by evaporation from the pores prior to heating the electrode to sinter the particles on the pore walls.

In order to retain the desired characteristic distribution of the particles on the pore walls, it is preferable that the liquid be evaporated at a temperature below its boiling point. It is therefore recommended to use inert low boiling liquids for the slurrying of the particles, such as alcohols, e.g. isopropanol; ketones, e.g. acetone; acetates, e.g., ethyl acetate, and other low boiling organic liquids in which the particles are insoluble. Various ethers may be used, petroleum ether being especially useful. After evaporation of the liquid, the powder is localized or fixed in the porous body as described hereinbefore by subjecting the electrode body to adequately elevated, i.e. sintering temperatures.

The invention thus provides the manufacture of wet-proofed electrodes from a single layer of the porous material. The desired distribution gradient of the particles can be achieved, as has been set out hereinbefore, by the proper balancing of the manufacturing conditions in relation to the material used. Of course, the invention is also applicable to electrodes which are built up from more than one layer of porous material.

The following examples are only illustrative and do not limit the invention described.

EXAMPLE 1

A porous nickel electrode body is produced by pressing and sintering carbonyl nickel powder having an average particle size of 7 to 9 microns which was mixed with 15 to 20 parts by weight of 100–240 mesh powder of ammonium bicarbonate per 100 parts of the metal powder. The diameter of the transversal pores ranges from about 3 to 50 microns.

The dry, porous electrode body obtained in this manner is wet-proofed in accordance with the present invention by the immersion of one side only of the electrode body in a suspension of 20% by weight of polytetrafluoroethylene particles in petroleum ether, as the low boiling liquid. The particles have an average diameter of about $0.2\mu$ with essentially no particles deviating from the average diameter by more than $\pm 50\%$. The suspension is sucked up in the pores of the electrode body by the effect of the capillary forces. When the electrode body has adsorbed the particles to capacity the electrode body is removed from the liquid suspension and the petroleum ether is evaporated. The dried electrode body is heated in an electric oven at 300° C. for about 5–15 minutes, or until sintering of the particles is substantially complete. The electrode body is then cooled and the electrode is activated for use as the oxygen electrode in a fuel cell by treatment with a solution of $H_2PtCl_6$, is a known way.

FIG. 1 in the attached drawing represents a channel-pore 1 in an electrode 2 of the prior art, wherein as a result of the good wettability of the metal wall 3 with the electrolyte 4, a true three phase boundary is not established. The interface 5, or meniscus, substantially covers the entire wall of the pore 1 and prevents the gas in the pore from contacting the wall.

FIG. 2 illustrates in schematic representation a channel-pore 1 in an electrode 3 of the present invention prepared as described in Example 1. In FIG. 2, the interface 5, or meniscus, is seen to bridge the innermost of the deposited sintered particles 7 in the pore 1, thereby allowing for the formation of a three phase boundary at the juncture of the electrolyte 5, the wall 3 and the gas 8 in the pore 1. The gas 8 thus contacts the wall 3 of the pore 1 to the depth of the innermost particles 7, thereby advantageously improving the operating characteristics of the electrode by making more catalyst impregnated area available to the operating gas 8 used in the fuel cell and entering the pore 1.

In FIGS. 1 and 2, the numeral 6 identifies sintered metal particles making up the body of the electrode on which a suitable catalyst, not shown, has been deposited by impregnation.

The illustrated channel-pore 1 represented in FIG. 2 has its highest hydrophobicity at the gas face opening at the right, with a gradual decrease of the hydrophobic properties toward the left or electrolyte face. The electrolyte 4 fills part of the channel-pore 1 at the left. The liquid interface 5 film is broken up in those areas where separate hydrophobic particles 7 are located. This breaking up of the liquid film has the effect of increasing manifold the three phase boundary.

EXAMPLE 2

An alloy of nickel and aluminum (50% nickel and 50% of aluminum by weight) is ground to a particle size of 40–50 microns and then mixed with carbonyl nickel powder. An electrode is shaped from this mixture and sintered; the nickel alloy is activated by dissolving out the aluminum. The electrode is treated with a 25%–50% Fluon dispersion, an aqueous dispersion of polytetrafluoroethylene in a suitable wetting agent. The dried porous electrode body is disposed in the suspension in such a way as to immerse evenly the entire surface of one of its faces. When the dispersion of the resin has been adsorbed in the pores, the electrode is removed from the liquid and is dried at 100° C. in an oven and then after an hour it is further heated for one hour at a temperature of 280–290° C. under a reducing atmosphere of hydrogen. The increase in weight of the electrode amounted to about 5 milligrams/cm.$^2$.

The electrode is then used in a half cell for electrochemical measurements. At a temperature of 30° C. and in a 6 normal aqueous solution of potassium hydroxide, a curve representing the voltage of the treated electrode operating under a pressure of 0.2 atmosphere above atmospheric pressure of hydrogen gas is recorded. In a comparative experiment the current density curve of a conventional, non-treated electrode, is compared with that of a treated electrode. The curves show that the treated electrode operates effectively under a pressure of 0.2 atmosphere above atmospheric while the conventional electrode must be under a pressure of 0.5 atmosphere above atmospheric under equivalent conditions (e.g. electrode potential U: −800 mv.; current density: 100 ma./cm.$^2$; 6 N aqueous solution of potassium hydroxide) for comparable performance.

Thus it is evident that the electrode of the present invention can be operated in a fuel cell battery at considerably lower gas pressures than comparable electrodes of the prior art. Untreated metal electrodes are customarily operated at gas pressures of about 1 to 1.5 atmospheres above atmospheric pressure. Unlike them the electrodes of the present invention can be operated effectively at a gas pressure as low as 0.1 to 0.2 atmosphere above atmospheric pressure. Also, fewer problems are encountered with the required gas- and liquid-tight closures in the components of the cell and in the establishment of effective seals. The pumps and the auxiliary equipment also may be of lighter construction and will have a longer useful life.

In accordance with the invention, it is advantageous that the coverage or blocking of the catalytically active sites in the electrodes of the present invention by the lyophobic or hydrophobic material is minimized, and in particular that the electrolyte is effectively excluded from the zone where its action is not desired. This is in contrast to the electrodes which have been made lyophobic or hydrophobic by the methods of the prior art. The electrodes of the present invention possess a combination of unexpected advantages in being provided by a gradual differential in the lyophobicity or hydrophobicity between the two faces of the electrodes.

The particular construction of the electrodes of the present invention assures that the electrolyte is most effectively excluded by the accumulation of the lyophobic or hydrophobic particles for those zones in the pores beyond which it should not penetrate. Thus, if the meniscus or interface 5, due to a drop in gas pressure of the gas 8, were to move to the right of the pore 1 in FIG. 2, another bridge or interface 5 would form at the next set of sintered particles 7 encountered by the electrolyte 4. This effect would be repeated at each level and would tend to prevent the electrolyte from flooding to the gas face.

In the practical use of the novel electrodes of the invention it has been found that the electrodes can be operated, as a result of the enlarged three phase boundary, at higher loads than the untreated electrodes of the prior art. It was also found that the polarization values of the electrodes of the invention are considerably lower than those of electrodes of the prior art. These advantages are particularly apparent in those electrodes in which the zone with a lesser density of particles extends closely to the openings of the pores on the electrolyte face of the electrode. This may be explained by the fact that the diffusion of the reaction products is less impeded in these electrodes.

The advantages of the electrodes of the present invention have been demonstrated in the foregoing description primarily on the basis of their use in fuel cells and fuel cell batteries. Similar advantages are achieved when the novel gas diffusion electrodes of the invention are utilized in electrochemical operations of other kinds, such as in the electrolysis, electrodialysis and in the electrochemical concentration of heavy water.

We claim:

1. A porous gas diffusion electrode body made up of a single layer of porous material having two opposite faces and pores extending from one face to the opposite face of the electrode and opening through said faces, wherein the walls of said pores are provided with particulate lyophobic material in such distribution that at the wall area of the pores near their openings at said one face of the electrode it is densely affixed to the wall, the density of the distribution of the particulate lyophobic material decreasing along the length of the pores to essentially no coverage adjacent the pore openings at said opposite face.

2. The electrode body of claim 1 wherein said lyophobic particulate material has been sintered on the walls of the pores.

3. The electrode body of claim 1 in which the particles of lyophobic material extend for a depth of at least 0.15 mm. into the pores measured from said one face.

4. The electrode body of claim 1 in which the average particle diameter of the individual particles of the lyophobic material ranges within a value of $d \pm 50\%$.

5. The electrode body of claim 4 wherein the average diameter of the particles of the lyophobic material is not greater than about ⅕ of the average diameter of the pores.

6. The electrode body of claim 1 in which the electrode body is a metal or a carbonaceous material.

7. The electrode of claim 1 in which the lyophobic material is a polyolefin, or polytetrafluoroethylene or poly chlorotrifluoroethylene.

8. The electrode body of claim 1 wherein the lyophobic material covers a portion of said one face around the pore openings.

References Cited
UNITED STATES PATENTS 3,423,247    1/1969    Darland, Jr., et al. __ 136—120FC WINSTON A. DOUGLAS, Primary Examiner O. F. CRUTCHFIELD, Assistant Examiner U.S. Cl. X.R.

136—86